United States Patent
Rude (10) Patent No.: US 9,451,028 B2
(45) Date of Patent: Sep. 20, 2016

(54) COMMUNICATION PROFILE SELECTION FOR VEHICLE TELEMATICS DEVICE

(71) Applicant: Zubie, Inc., Bloomington, MN (US)

(72) Inventor: Michael John Rude, Excelsior, MN (US)

(73) Assignee: Zubie, Inc., Bloomington, MN (US)

( * ) Notice: Subject to any disclaimer, the term of this patent is extended or adjusted under 35 U.S.C. 154(b) by 138 days.

(21) Appl. No.: 14/454,885

(22) Filed: Aug. 8, 2014

(65) Prior Publication Data

US 2015/0052226 A1    Feb. 19, 2015

Related U.S. Application Data

(60) Provisional application No. 61/866,161, filed on Aug. 15, 2013.

(51) Int. Cl.
*H04L 12/24* (2006.01)
*H04L 29/08* (2006.01)
*G07C 5/00* (2006.01)

(52) U.S. Cl.
CPC ............... *H04L 67/12* (2013.01); *G07C 5/008* (2013.01)

(58) Field of Classification Search
CPC ..... G07C 5/008; H04L 67/12; H04L 67/306; G06F 19/322; G06Q 30/02; H04W 8/18
See application file for complete search history.

(56) References Cited

U.S. PATENT DOCUMENTS

| | | |
|---|---|---|
| 5,430,432 A | 7/1995 | Camhi et al. |
| 5,465,079 A | 11/1995 | Bouchard et al. |
| 5,499,182 A | 3/1996 | Ousborne |
| 5,797,134 A | 8/1998 | McMillan et al. |
| 6,064,970 A | 5/2000 | McMillan et al. |
| 6,594,579 B1 | 7/2003 | Lowrey et al. |
| 6,636,790 B1 | 10/2003 | Lightner et al. |
| 6,714,894 B1 | 3/2004 | Tobey et al. |
| 6,732,031 B1 | 5/2004 | Lightner et al. |
| 6,868,386 B1 | 3/2005 | Henderson et al. |
| 7,124,088 B2 | 10/2006 | Bauer et al. |
| 7,877,269 B2 | 1/2011 | Bauer et al. |
| 8,090,598 B2 | 1/2012 | Bauer et al. |
| 8,140,358 B1 | 3/2012 | Ling et al. |
| 8,977,408 B1 * | 3/2015 | Cazanas ................ H04L 41/082 455/3.03 |
| 2011/0196571 A1 | 8/2011 | Foladare et al. |
| 2012/0004933 A1 | 1/2012 | Foladare et al. |
| 2012/0010906 A1 | 1/2012 | Foladare et al. |
| 2012/0209634 A1 | 8/2012 | Ling et al. |
| 2012/0313771 A1 | 12/2012 | Wittliff, III |

FOREIGN PATENT DOCUMENTS

JP    H4182868    6/1992

* cited by examiner

*Primary Examiner* — Kim T Nguyen
(74) *Attorney, Agent, or Firm* — Pederson IP, LLC (57) ABSTRACT

One embodiment is directed to a method of selecting a communication profile for a vehicle telematics device to communicate over a vehicle electronics bus. The method includes receiving, at a server or a local computer, information identifying a vehicle to which the vehicle telematics device is to be connected. An indication of a communication profile to be loaded on the vehicle telematics device, or the communication profile itself, is sent from the server or local computer to the vehicle telematics device, wherein the communication profile includes communication related settings for the vehicle telematics device, the communication related settings corresponding to the vehicle electronics bus of the vehicle to which the vehicle telematics device is to be connected. The communication profile is then loaded on the vehicle telematics device, wherein the vehicle telematics device is field configurable to use one of multiple communication profiles.

20 Claims, 5 Drawing Sheets

FIG. 5

COMMUNICATION PROFILE SELECTION FOR VEHICLE TELEMATICS DEVICE

CROSS-REFERENCE TO RELATED APPLICATIONS

This application claims the benefit of U.S. Provisional Patent Application Ser. No. 61/866,161, filed on Aug. 15, 2013, which is hereby incorporated herein by reference.

BACKGROUND

Aftermarket vehicle telematics devices are devices that can be installed within a vehicle and used to monitor information regarding operation of the vehicle. Vehicle telematics devices are used to collect data for many different purposes, such as for fleet management and usage based insurance. As such, vehicle telematics devices can collect many different types of data such as, but not limited to, vehicle operating characteristics (e.g., fuel level, speed, brake application, RPM), location, and temperature. Many vehicle telematics devices connect to an on-board diagnostic (OBD) port of a vehicle to obtain information from a vehicle electronics bus. With a connection to the vehicle bus, the vehicle telematics device can monitor sensors and control components for the vehicle to obtain operation characteristics thereof.

SUMMARY

One embodiment is directed to a method of a method of selecting a communication profile for a vehicle telematics device to communicate over a vehicle electronics bus. The method includes receiving, at a server or a local computer, information identifying a vehicle to which the vehicle telematics device is to be connected. An indication of a communication profile to be loaded on the vehicle telematics device, or the communication profile itself, is sent from the server or local computer to the vehicle telematics device, wherein the communication profile includes communication related settings for the vehicle telematics device, the communication related settings corresponding to the vehicle electronics bus of the vehicle to which the vehicle telematics device is to be connected. The communication profile is then loaded on the vehicle telematics device, wherein the vehicle telematics device is field configurable to use one of multiple communication profiles.

DETAILED DESCRIPTION

The subject matter described herein pertains to selection of a communication profile by a vehicle telematics device, wherein the communication profile is used by the vehicle telematics device to communicate with the vehicle through a vehicle communication interface. In particular, embodiments described herein pertain to vehicle telematics devices that can receive an indication of a communication profile, or the communication profile itself, from a server, wherein the server provides the indication or profile based on information identifying the vehicle to which the vehicle telematics device is to be connected.

Figure 1:
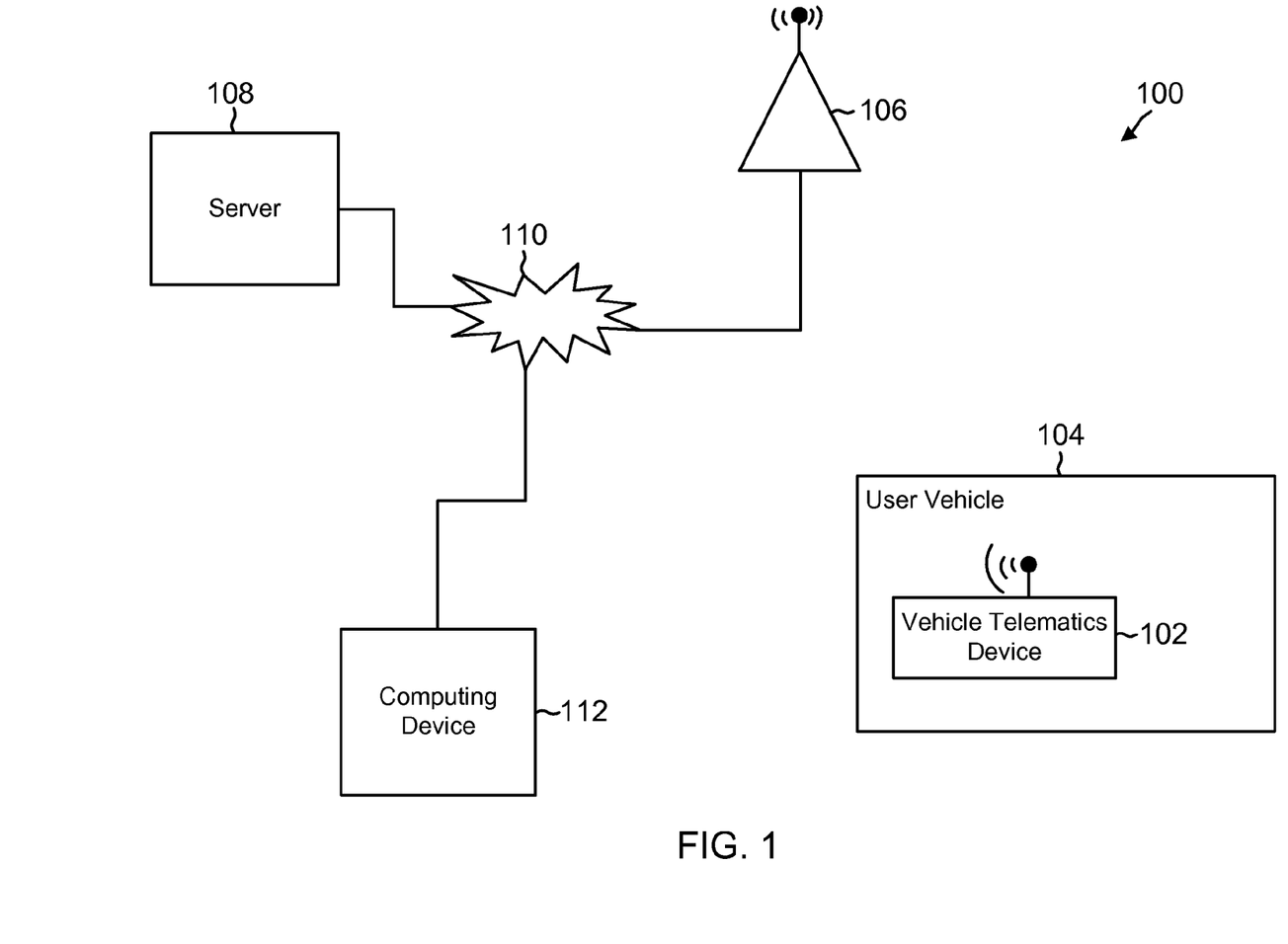
FIG. 1 is a block diagram of an example system including a vehicle telematics device and a server including a database linking vehicles to corresponding communication profiles.

FIG. 1 is a block diagram of an example system 100 including a vehicle telematics device 102. The vehicle telematics device 102 can be physically installed in a vehicle 104 by connecting the vehicle telematics device 102 to a vehicle communication interface of the vehicle 104. The vehicle telematics device 102 monitors information regarding operation of the vehicle 104. The vehicle communication interface is also referred to herein as simply "vehicle interface", and can include, but is not limited to, an on-board diagnostics (OBD) port, OBD-II port, controller area network (CAN) port, and the like.

The vehicle information monitored by the vehicle telematics device 102 includes vehicle operating characteristics (e.g., fuel level, speed, brake application, RPM), location, temperature, and any other information obtained from any vehicle system, subsystem, or sensor communicatively coupled with the vehicle telematics device 102.

The vehicle telematics device 102 is configured to send data (e.g., vehicle information) obtained or otherwise generated to a server 108. The server 108 can store and/or analyze the data to achieve the intended purpose for the data. The communication of the data from the vehicle telematics device 102 to the server 108 can take any suitable form. For example, the vehicle telematics device 102 can be configured to wirelessly communicate with a cellular tower 106 which is coupled to a network 110 such as the internet. The server 108 can also be communicatively coupled to the network 110 such that the vehicle telematics device 102 can send the data to the tower 106 through the network 110 and to the server 108. In another example, the vehicle telematics device 102 is configured to communicate with a local area network using, for example, WiFi, which in turn is coupled to the network 110. In yet another example, the vehicle telematics device 102 is configured to communicate with a personal computing device (e.g., via USB) that can be coupled to the network 110 and relay the data from the vehicle telematics device 102 to the server 108.

The vehicle telematics device 102 can be configured to upload the data to the server 108 on a real-time, period, or on-demand basis. For example, in implementations when the vehicle telematics device 102 is capable of communicating with a cellular tower 106, the data can be uploaded to the server 108 in real-time whenever a cellular tower 106 is within range. In other examples, the vehicle telematics device 102 can buffer data and periodically upload (e.g., via the cellular tower 106). In yet other examples, such as when the vehicle telematics device 102 communicates by connecting to a personal computer, the vehicle telematics device 102 can provide the data in response to a command from the user.

The vehicle telematics device 102 may be obtained by a user via a provider of services corresponding to the vehicle telematics device 102 or via a retail outlet. Once obtained, the user can install the vehicle telematics device 102 by connecting the vehicle telematics device 102 to an interface connector of the vehicle 104. Upon connecting with the interface connector of the vehicle 104, the vehicle telematics device 102 can initiate communication with a vehicle electronics bus via the interface connector.

Figure 2:
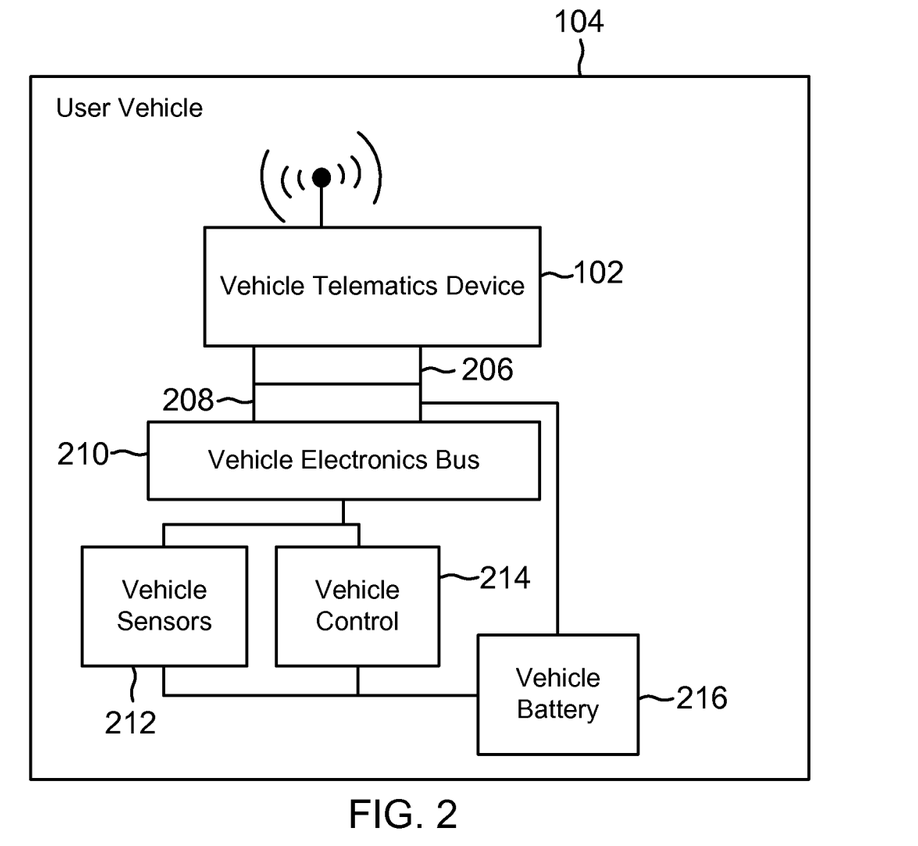
FIG. 2 is a block diagram of an example vehicle having the vehicle telematics device of FIG. 1 installed therein.

FIG. 2 is a block diagram of an example vehicle 104 including an example vehicle telematics device 102. The vehicle telematics device 102 is an aftermarket device that is coupled to one or more vehicle electronics buses 210 through a vehicle interface of the vehicle 104. The vehicle telematics device 102 includes an interface connector 206 configured to connect to a mating interface connector 208 on the vehicle 104. The interface connector 208 on the vehicle 104 is coupled to a vehicle electronics bus 210 over which vehicle sensors 212, vehicle control electronics 214, and other electronics in the vehicle 104 communicate. The vehicle sensors 212 and the vehicle control electronics 214 receive power from a battery 216 in the vehicle 104. As known, this battery 216 can also be the battery that provides power for starting and/or driving the vehicle 104. The battery 216 can also be coupled to a plurality of conductors on the interface connector 208 of the vehicle 104. These conductors can contact corresponding power conductors on the interface connector 206 of the vehicle telematics device 102. In this way, the vehicle telematics device 102 can obtain operating power from the battery 216 of the vehicle 104 through the interface connectors 206, 208. Example interface connectors 206, 208 include the SAE-J1962 connector, which is the connector for the OBD-II protocol described in the SAE-J1978 standard, the SAE-J1939 connector, and the SAE-J1708 connector. The vehicle 104 can include any automobile having an interface connector 208 including, but not limited to, a car, pick-up, SUV, bus, motorcycle, motorhome, off-road vehicle, utility vehicle, semi-tractor, watercraft, and an aircraft.

To enable a single vehicle telematics device 102 to be used with a variety of vehicles 104, the vehicle telematics device 102 is field configurable to use one of multiple different communication profiles. In particular, the vehicle telematics device 102 can be configured to use a communication profile corresponding to a particular vehicle (e.g., a particular make or model of vehicle). A vehicle telematics device 102 that is configured to use a particular communication profile is referred to herein as being "loaded" with that particular communication profile. Field configurable includes configuration by a sales associate or the like that will be providing the vehicle telematics device 102 to a user. Field configurable also includes configuration after the vehicle telematics device 102 has been provided to a user. In many examples, the configuration of which communication profile to use is performed prior to plugging-in of the vehicle telematics device 102 into a vehicle interface for the vehicle 104. In some examples, however, the vehicle telematics device 102 can be initially plugged into the vehicle interface before being configured to use a selected communication profile.

A communication profile refers to a digital file including data to implement a configuration of the vehicle telematics device, and can include any of various communication related settings corresponding to a particular vehicle. For example, the communication profile corresponding to a given vehicle (e.g., make or model) can include the communication protocol corresponding to that vehicle, since different vehicles may use different communication protocols on their vehicle electronics bus 210. A communication protocol included in a communication profile can include a publicly available (e.g., standard) communication protocol or a proprietary communication protocol. A communication protocol can include definitions of particular signaling to use and/or can include definitions of which pins on the vehicle telematics device 102 to communicate given signaling over.

Example communication protocols to which the vehicle telematics device can be configured include SAE-J1850 PWM, SAE-J1850 VPW, ISO9141-2, ISO14230-4, and ISO15765-4. When a communication profile having such a communication profile is loaded onto the vehicle telematics device 102, the vehicle telematics device 102 can be configured to use that communication protocol for signals to and/or from the vehicle electronics bus 210. In many examples, such configuration of the vehicle telematics device 102 involves changes to software (e.g., firmware). In some examples, however, the vehicle electronics bus 210 can include hardware switches, such as switches coupling a particular pin on the interface connector of the vehicle telematics device 102 to particular electronics within the vehicle telematics device 102, and configuration of the vehicle telematics device 102 can include setting such hardware switches. In some examples, a communication profile can configure the vehicle telematics device 102 to use multiple communication protocols simultaneously, such as to use different communication protocols with different devices (e.g., ECUs) on the vehicle.

A communication protocol can also configure the vehicle telematics device 102 with multiple communication protocols and/or particular messages to send and receive with the vehicle. For example, a communication protocol can configure the vehicle telematics device 102 to send and/or receive proprietary messages with a proprietary protocol, or use proprietary messages with a publicly available communication protocol. The communication profile can also include proprietary protocols in addition to a public protocol. Such a proprietary protocol can communicate over one or more other vehicle electronics buses 210 than a vehicle electronics bus 210 used for the public protocol, and the vehicle electronics device can couple to such other vehicle electronics bus(es) 210 over different pins of the vehicle interface. Examples proprietary protocols are provided by Ford, Chrysler, and GM as well as other vehicle manufacturers.

In some examples, the vehicle telematics device 102 selects the communication profile to use in response to an indication of which communication profile to use provided by a remote server (e.g., server 108) or a local computer having the requisite software thereon. The indication can be in any suitable form. For example, the indication can comprise an explicit reference to the communication profile or a communication protocol (e.g., ISO 123 or communication profile #3). The indication can also comprise an indirect reference to the communication profile, such as a reference to the type of vehicle 104 to which the vehicle telematics device 102 is currently, or is to be, connected. The type of vehicle can be indicated, for example, as a make, model, and year, or with a VIN or partial VIN for the vehicle 104. The vehicle telematics device 102 can then link the type of vehicle to a communication profile corresponding to that vehicle.

Upon receiving an indication, the vehicle telematics device 102 can select and load the communication profile corresponding to the indication, wherein the vehicle telematics device 102 is capable of being configured to use any one of multiple communication profiles. In an example, the multiple communication profiles can be stored on a storage device in the vehicle telematics device 102. The vehicle telematics device 102 can select and load the communication profile corresponding to the indication from the multiple communication profiles stored on the storage device. The vehicle telematics device 102 can then communicate with the vehicle electronics bus 210 using the configuration according to the selected and loaded communication profile when the vehicle telematics device 102 is plugged-in to the vehicle interface for the vehicle 104.

In some examples, the communication profile can be sent to the vehicle telematics device 102 from a remote server or local computer. In such examples, the remote server or local computer can determine the communication protocol for use by the vehicle telematics device 102 and can send the communication profile corresponding to that communication protocol to the vehicle telematics device 102.

In examples where the vehicle telematics device 102 is configured by a sales associate or the like, the vehicle telematics device 102 can be configured to communicate with communication profile selection software that is accessible by the sales associate. In some examples, such communication profile selection software may not be available to a general user of the vehicle telematics device 102 such that the user is required to go through the sales associate to load the communication profile onto the vehicle telematics device 102. In some implementations of such an example, such communication profile software may be implemented on a local computer accessible to the sales associate. In such an implementation, the vehicle telematics device 102 can be communicatively coupled (wirelessly or via a physical communication medium) to the local computer and can receive the indication of which communication profile to use, or can receive the communication profile itself, from the communication profile software on the local computer. Such a local computer can include a desktop computer, laptop computer, tablet, mobile phone, personal data assistant (PDA), specialized communication profile loading device, or other computing device. In other implementations of such an example, the communication profile software can be located on a remote server (e.g., server 108) that is accessible by the sales associate. The vehicle telematics device 102 can communicate with such a remote server through any suitable means such as wirelessly (e.g., via a LAN wireless protocol) or through a local computer and a physical communication medium (e.g., USB). In such an implementation the indication of which communication profile to use, or the communication profile itself, can be sent from the remote server.

In examples where the vehicle telematics device 102 is configured for use while the user has possession of the vehicle telematics device 102, the vehicle telematics device 102 can similarly be configured to communicate with communication profile software on a remote server (e.g., server 108). Depending on the capabilities of the vehicle telematics device 102, communication between the vehicle telematics device 102 and the server can using one of the above communication means, such as via a wireless link with the tower 106 or via a connection (wireless or physical) between the computing device 112 and the vehicle telematics device 102. In such an implementation, the vehicle telematics device 102 can receive the indication of which communication profile to use, or can receive the communication profile itself, from the remove server. In some implementations, the vehicle telematics device 102 is configured to communicate with a computing device 112 that is local to the user which, in turn, enables communication with the remote server 108. In such an implementation, the user can connect a physical communication medium (e.g., a USB cable) between the vehicle telematics device 102 and the computing device 112. In examples where the vehicle telematics device 102 does not provide its own power (e.g., via an internal battery), the vehicle telematics device 102 can obtain operating power from the computing device 112 over the physical communication medium. In such an implementation, the vehicle telematics device 102 can receive the indication of which communication profile to use, or can receive the communication profile itself, from the local computing device.

In some examples, the vehicle telematics device 102 can be configured to obtain operating power from the vehicle interface of the vehicle 104 prior to any communication with the vehicle 104. For example, the vehicle telematics device 102 can be configured to use power provided on the power conductors of the interface connector 208 to operate for communicating with the cellular tower 106 or other wireless device. The vehicle telematics device 102 can perform such communications with the cellular tower 106 or other wireless device prior to attempting communication with the vehicle electronics bus 210. Once the vehicle telematics device 102 has received the indication of the communication profile from the remote server and selected the corresponding communication profile (or received the communication profile from the remote server), the vehicle telematics device 102 can communicate with and/or monitor the vehicle electronics bus 210. In such an implementation, the user can simply plug the vehicle telematics device 102 into the vehicle interface of the vehicle 104 and the vehicle telematics device 102 can perform the above automatically (i.e., without further input from the user).

The remote server or local computer that provides the indication of the communication profile, or provides the communication profile itself, can determine which communication profile to use based on information identifying the vehicle 104 to which the vehicle telematics device 102 is to be connected. In an example, such identifying information can be provided by the user of the vehicle telematics device 102. For example, the user may provide information identifying the type of vehicle (e.g., make, model, and/or year or a VIN) to a sales associate which can then input the information to the communication profile selection software on their local computer or to a web portal for the remote server. In other examples, the user can provide information identifying the type of vehicle over the phone or via a web portal to the remote server (for example, during provisioning of the vehicle telematics device).

In another example, the vehicle telematics device 102 can be configured to perform some communication with the vehicle electronics bus 210 prior to loading a communication profile. For example, the vehicle telematics device 102 can be initially configured to use a standard or basic communication profile for use with a range of vehicles. Upon being connected to the vehicle interface and communicating with a particular vehicle, the vehicle telematics device 102 can be configured to detect information (e.g., a VIN) identifying the vehicle (e.g., more specifically identifying a particular make, model, and/or year from the range of vehicles with which the vehicle telematics device 102 can communicate). In such an example, the vehicle telematics device 102 can send the information identifying the vehicle to a remote server or local computer to which the vehicle telematics device 102 is in communication.

The remote server or local computer can include a database linking particular vehicles or sets of vehicle to one or more communication profiles. Using that database, the remote server or local computer can select the communication profile to use based on the information provided by the user and/or by the vehicle telematics device 102. The remote server or local computer can then send an indication of a communication profile, or the communication profile itself, to the vehicle telematics device 102. The vehicle telematics device 102 can then load the communication profile and communicate with the vehicle using the communication protocols corresponding thereto.

Information can also be sent to the server or local computed identifying the vehicle telematics device 102. Due to different components and/or designs, different vehicle telematics devices 102 may use different communication profiles for a given vehicle. Thus, information can also be sent to the sever or local computing identifying the vehicle telematics device 102 such that the communication profile corresponding to the vehicle 104 and the vehicle telematics device 102 can be selected. The information identifying the vehicle telematics device 102 can be any appropriate information, such as a serial number, and can be sent in any of the manners described herein with respect to the information identifying a vehicle. For example, the information identifying the vehicle telematics device 102 can be sent by the vehicle telematics device 102 or can be received from a user who inputs the information (e.g., into a local computer).

In some examples, the vehicle telematics device 102 can be configured to detect if a selected communication profile is not working with a vehicle 104 and, if so, perform an auto-detect sequence to try to determine the correct communication profile to use.

Figure 3:
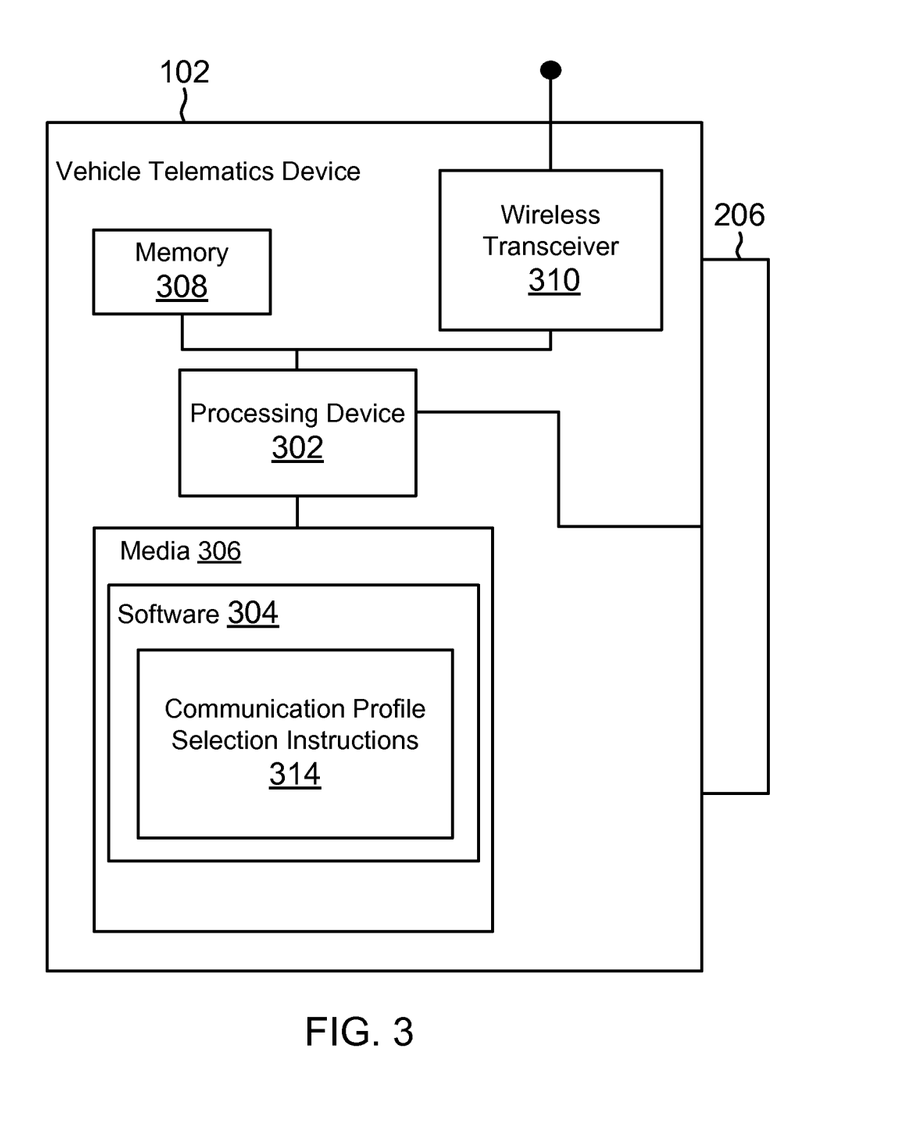
FIG. 3 is a block diagram of an example vehicle telematics device for use in the system of FIG. 1 and the vehicle of FIG. 2.

FIG. 3 is a block diagram of an example vehicle telematics device 102. The vehicle telematics device 102 can include one or more processing devices 302 for executing instructions 304. The one or more processing devices 302 can include a general purpose processor or a special purpose processor. The instructions 304 are stored (or otherwise embodied) on or in an appropriate storage medium or media 306 (such as flash or other non-volatile memory) from which the instructions 304 are readable by the programmable processor(s) 302 for execution thereby. The vehicle telematics device 102 also includes memory 308 that is coupled to the programmable processor(s) 302 for storing instructions (and related data) during execution by the programmable processor(s) 302. Memory 308 comprises, in one implementation, any suitable form of random access memory (RAM) now known or later developed, such as dynamic random access memory (DRAM). In other implementations, other types of memory are used. The vehicle telematics device 102 also includes the interface connector 206 discussed above.

The vehicle telematics device 102 can include the electronic components for communication with the appropriate device, such as a wireless transceiver 310 for communication with a cellular tower 106 or a wireless access point, or a transceiver for communication over a wired medium such as a CAT-5 cable or Universal Serial Bus (USB). Wireless communications between the wireless transceiver 310 and other devices can conform to any suitable protocol. For example, wireless communications between the wireless transceiver 310 and a local area networked component can use IEEE 802.11 (WiFi), IEEE 802.14.5 (ZigBee), Bluetooth, a proprietary protocol, or other protocol. Example, wireless communication protocols between the wireless transceiver 310 and the cellular tower 106 include 2G (e.g., GPRS), 2.5G, 3G, or 4G (e.g., WiMax, LTE) protocol, or any future protocol.

The instructions 304 on the vehicle telematics device 102 include communication profile selection and loading instructions 314 that are configured to cause the programmable processor(s) 302 to implement the functions of the vehicle telematics device 102 described herein; in particular to implement the functions to receive an indication of a communication profile, or a communication profile itself, and to load that communication profile for use.

Figure 4:
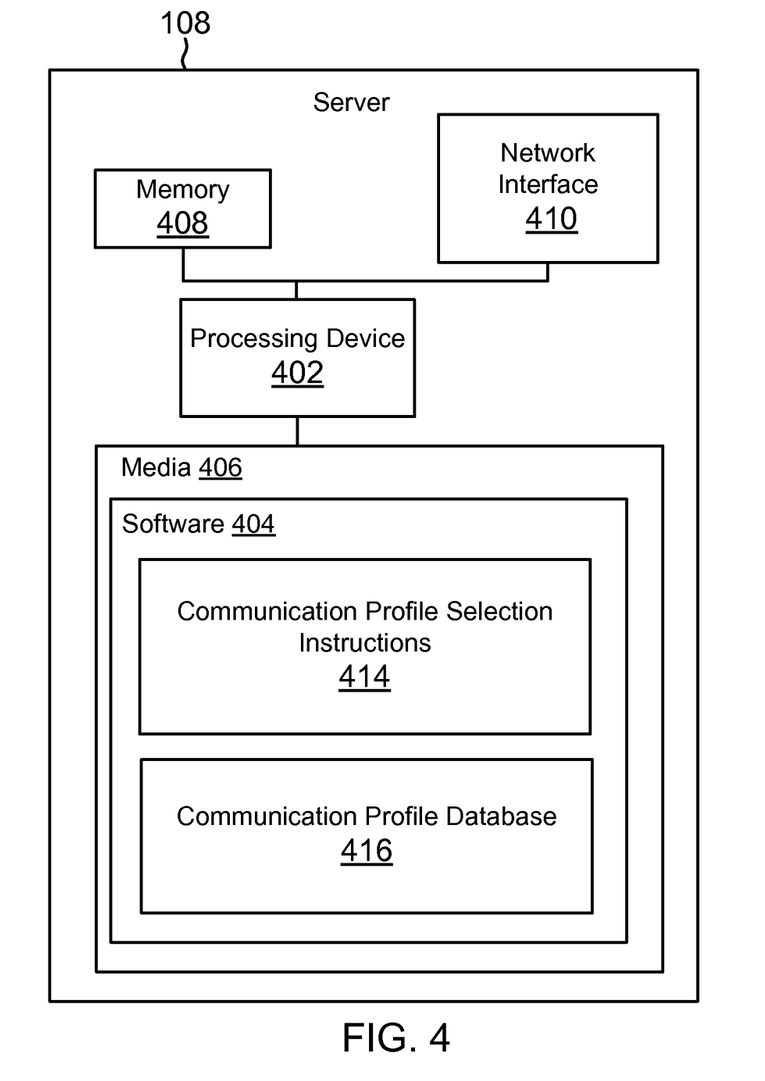
FIG. 4 is a block diagram of an example server for use in the system of FIG. 1.

FIG. 4 is a block diagram of an example server 108 that can receive information identifying a vehicle and send an indication of a communication profile or a communication profile itself to the vehicle telematics device 102. Server 108 includes one or more processing devices 402 for executing instructions 404. The one or more processing devices 402 can include a general purpose processor or a special purpose processor. The instructions 404 are stored (or otherwise embodied) on or in an appropriate storage medium or media 406 (such as flash or other non-volatile memory) from which the instructions 404 are readable by the processing device(s) 402 for execution thereby. The server 108 also includes memory 408 that is coupled to the processing device(s) 402 for storing instructions (and related data) during execution by the processing device(s) 402. Memory 408 comprises, in one implementation, any suitable form of random access memory (RAM) now known or later developed, such as dynamic random access memory (DRAM). In other implementations, other types of memory are used. The server 108 also includes a network interface 410 for communicatively coupling the server 108 to other devices or networks. The instructions 404 include communication profile selection instructions 414 that are configured to cause the processing device(s) 402 to implement the functions of the server 108 described above. Also on the media 406 can be a database 416 linking particular vehicles or sets of vehicle to one or more communication profiles as described above.

Figure 5:
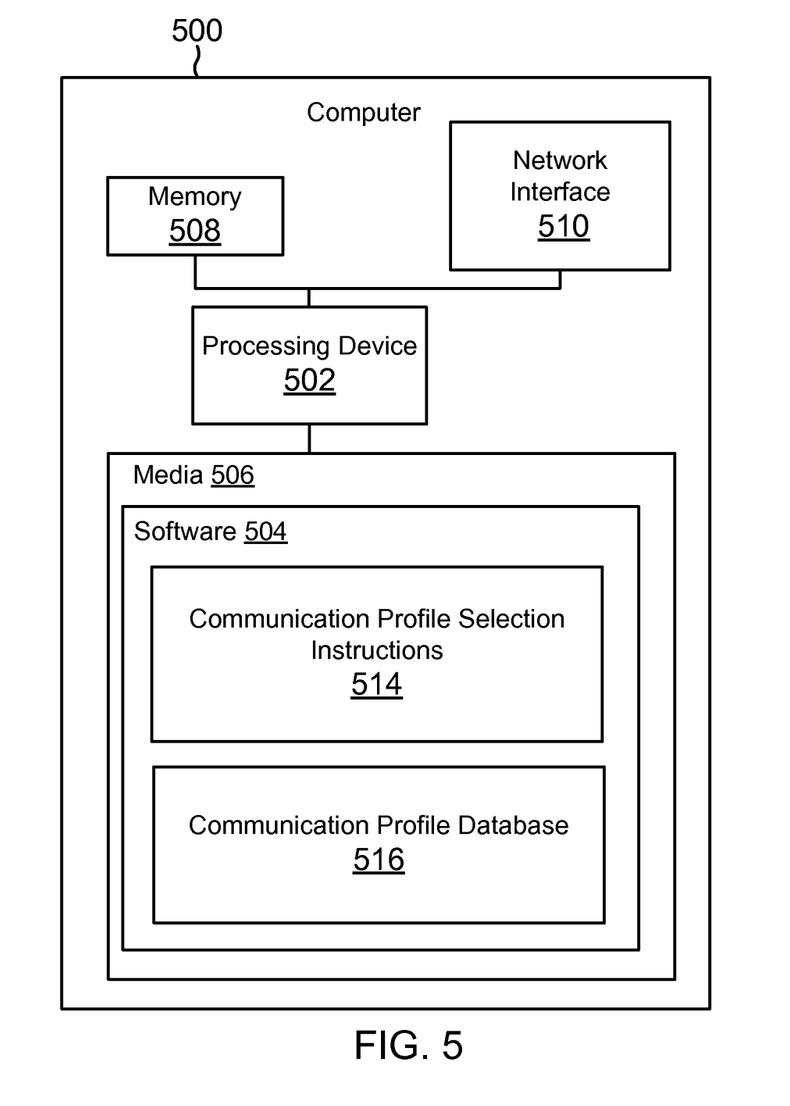
FIG. 5 is a block diagram of an example local computer for communicating a communication profile selection with the vehicle telematics device.

FIG. 5 is a block diagram of an example local computer 500 that can receive information identifying a vehicle and send an indication of a communication profile or a communication profile itself to the vehicle telematics device 102. Local computer 500 includes one or more processing devices 502 for executing instructions 504. The one or more processing devices 502 can include a general purpose processor or a special purpose processor. The instructions 504 are stored (or otherwise embodied) on or in an appropriate storage medium or media 506 (such as flash or other non-volatile memory) from which the instructions 504 are readable by the processing device(s) 502 for execution thereby. The computer 500 also includes memory 508 that is coupled to the processing device(s) 502 for storing instructions (and related data) during execution by the processing device(s) 502. Memory 508 comprises, in one implementation, any suitable form of random access memory (RAM) now known or later developed, such as dynamic random access memory (DRAM). In other implementations, other types of memory are used. The computer 500 also includes a network interface 510 for communicatively coupling the computer 500 to other devices or networks. The instructions 504 include communication profile selection instructions 514 that are configured to cause the processing device(s) 502 to implement the functions of the local computer described above. Also on the media 506 can be a database 516 linking particular vehicles or sets of vehicle to one or more communication profiles as described above.

What is claimed is:

1. A method of selecting a communication profile for a vehicle telematics device to communicate over a vehicle electronics bus, the method comprising:
  receiving, at a server or a local computer, information identifying a vehicle to which the vehicle telematics device is to be connected;
  sending from the server or local computer to the vehicle telematics device an indication of a communication profile to be loaded on the vehicle telematics device, or the communication profile, wherein the communication profile includes communication related settings for the vehicle telematics device, the communication related settings corresponding to the vehicle electronics bus of the vehicle to which the vehicle telematics device is to be connected; and loading the communication profile on the vehicle telematics device, wherein the vehicle telematics device is field configurable to use one of multiple communication profiles.

2. The method of claim 1, comprising:
obtaining, by the vehicle telematics device over the vehicle electronics bus, the information identifying the vehicle; and
sending the information identifying the vehicle from the vehicle telematics device to the server or local computer.

3. The method of claim 2, wherein the information identifying the vehicle is a vehicle identification number (VIN).

4. The method of claim 1, comprising:
receiving from a user, by the local computer or at web portal, the information identifying the vehicle.

5. The method of claim 1, wherein the communication profile includes one of a standard communication protocol or a proprietary communication protocol.

6. The method of claim 5, wherein the communication profile includes proprietary messages for use with one of the standard communication protocol or the proprietary communication protocol.

7. The method of claim 1, wherein the communication profile includes a communication protocol corresponding to the vehicle electronics bus that includes definitions of particular signaling to use.

8. The method of claim 1, wherein the communication profile includes definitions of which pins on the vehicle telematics device to communicate given signaling over.

9. The method of claim 1, wherein sending the indication of the communication profile, or the communication profile, comprises sending from a remote server via a cellular tower to the vehicle telematics device.

10. The method of claim 1, wherein the vehicle telematics device is configured to be coupled to the local computer via a physical communication medium and to receive the indication of the communication profile, or the communication profile, and operating power over the physical communication medium.

11. A system for selecting a communication profile for a vehicle telematics device, the system comprising:
a vehicle telematics device configured to connect to a connector for a vehicle communication interface and to obtain information from a vehicle over the vehicle communication interface, wherein the vehicle telematics device is configurable to use one of multiple communication profiles; and
a server or local computer configured to:
receive information identifying the vehicle to which the vehicle telematics device is to be connected;
send to the vehicle telematics device an indication of a communication profile to be loaded on the vehicle telematics device, or the communication profile, wherein the communication profile includes communication related settings for the vehicle telematics device, the communication related settings corresponding to a vehicle electronics bus of the vehicle to which the vehicle telematics device is to be connected;
wherein the communication profile from the server or local computer is one of the multiple communication profiles, and wherein the vehicle telematics device is configured to load the communication profile for communication over the vehicle electronics bus.

12. The system of claim 11, wherein the vehicle telematics device is configured to:
obtain the information identifying the vehicle over the vehicle electronics bus; and
send the information identifying the vehicle from the vehicle telematics device to the server or local computer.

13. The system of claim 12, wherein the information identifying the vehicle is a vehicle identification number (VIN).

14. The system of claim 11, wherein the communication profile includes one of a standard communication protocol or a proprietary communication protocol.

15. The system of claim 14, wherein the communication profile includes proprietary messages for use with one of the standard communication protocol or the proprietary communication protocol.

16. The system of claim 11, wherein the communication profile includes a communication protocol corresponding to the vehicle electronics bus that includes definitions of particular signaling to use.

17. The system of claim 11, wherein the communication profile includes definitions of which pins on the vehicle telematics device to communicate given signaling over.

18. The system of claim 11, wherein the vehicle telematics device is configured to be coupled to the local computer via a physical communication medium and to receive the indication of the communication profile, or the communication profile, and operating power over the physical communication medium.

19. A vehicle telematics device comprising:
a vehicle interface connector configured to connect to a mating vehicle interface connector on a vehicle;
one or more processing devices;
one or more data storage mediums coupled to the one or more processing devices, the one or more data storage mediums including instructions which, when executed by the one or more processing devices, cause the one or more processing devices to:
obtain information identifying the vehicle to which the vehicle interface connector is connected over a vehicle electronics bus to which the vehicle interface connector is coupled;
send the information identifying the vehicle to a server;
receive from the server an indication of a communication profile or the communication profile, wherein the communication profile includes communication related settings for the vehicle telematics device, the communication related settings corresponding to the vehicle electronics bus of the vehicle to which the vehicle telematics device is to be connected;
load the communication profile, wherein the vehicle telematics device is field configurable to use one of multiple communication profiles; and
communicate over the vehicle electronics bus using the communication profile.

20. The vehicle telematics device of claim 19, wherein the instructions are configured to cause the one or more processing devices to:
monitor information regarding the vehicle over the vehicle electronics bus.

* * * * *